US010868788B1

(12) United States Patent
Underwood et al.

(10) Patent No.: US 10,868,788 B1
(45) Date of Patent: Dec. 15, 2020

(54) SYSTEMS AND METHODS FOR GENERATING DIGITAL CHANNEL CONTENT

(71) Applicant: Facebook, Inc., Menlo Park, CA (US)

(72) Inventors: Patrick Joseph Roark Underwood, San Francisco, CA (US); Geoff David Joseph Teehan, Palo Alto, CA (US); George Lewis Kedenburg, III, San Francisco, CA (US); Jason Holland, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/358,969

(22) Filed: Mar. 20, 2019

(51) Int. Cl.
*H04L 12/58* (2006.01)
*G06F 3/0482* (2013.01)
*H04L 29/08* (2006.01)

(52) U.S. Cl.
CPC ............ *H04L 51/32* (2013.01); *G06F 3/0482* (2013.01); *H04L 67/22* (2013.01); *H04L 67/30* (2013.01); *H04L 67/306* (2013.01); *H04L 67/327* (2013.01); *H04L 51/08* (2013.01)

(58) Field of Classification Search
CPC ....... H04L 51/32; H04L 51/08; H04L 67/327; H04L 67/30; H04L 67/306; H04L 67/22; G06F 3/0482
See application file for complete search history.

(56) References Cited

U.S. PATENT DOCUMENTS

2012/0151322 A1* 6/2012 Lindsay ................. H04L 51/32
715/234
2019/0095067 A1* 3/2019 Huang .................... G06F 16/51

* cited by examiner

*Primary Examiner* — Michael A Keller
(74) *Attorney, Agent, or Firm* — FisherBroyles, LLP

(57) ABSTRACT

Systems and methods for generating digital channel content based on a predictive suggestion may include (1) identifying content stored in a digital container for a user of a social networking platform, (2) providing the user with a digital prompt suggesting that the user add the content to a channel configured to share social media posts from the user to other users of the social networking platform, (3) receiving user input accepting the suggestion, and (4) in response to receiving the user input, adding the content to the channel. Various other methods, systems, and computer-readable media are also disclosed.

20 Claims, 3 Drawing Sheets

SYSTEMS AND METHODS FOR GENERATING DIGITAL CHANNEL CONTENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
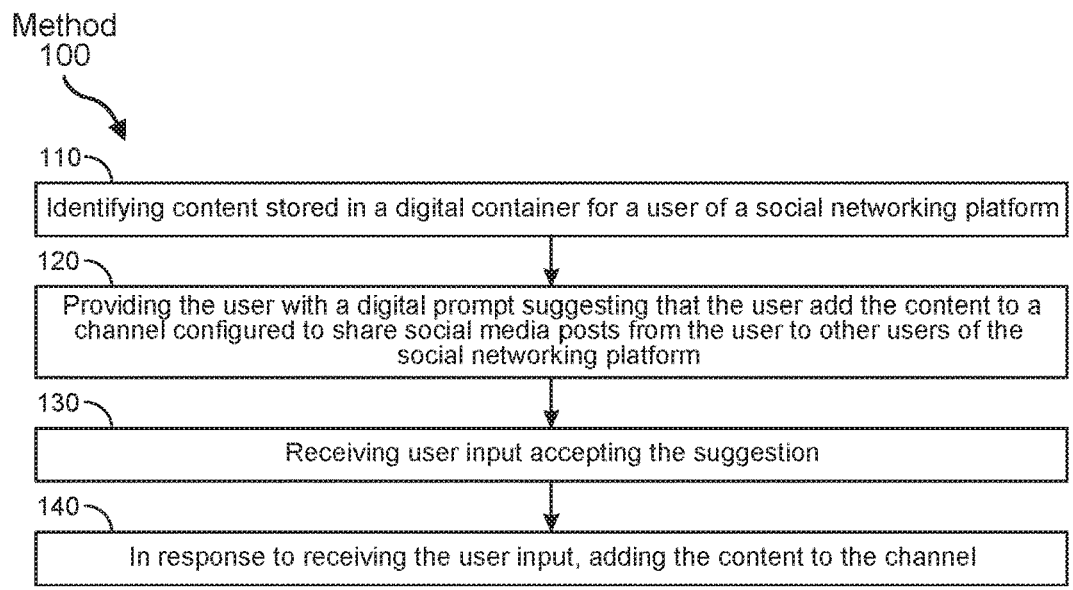
FIG. 1 is a flow diagram of an exemplary method for generating digital channel content based on a predictive suggestion.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In the modern world, platforms for digitally storing and/or sharing content abound. Often, a given user of a computing device will store and/or share content using multiple different platforms. For example, a user may store and/or share content via a text messaging application, a digital photo album, a social media profile, a personal cloud, and a video-sharing website. This abundance of platforms may cause several complications or inefficiencies. For example, a user who wishes to share the same content via multiple platforms may be tasked with repetitively uploading the same data several times. Additionally, the abundance may create organizational difficulties (e.g., it may be difficult for a user to remember where different content is stored or to which platforms the user has shared or not shared particular content). Therefore, the present disclosure is generally directed to improved systems and methods for organizing user data within content storage and content sharing platforms.

Embodiments of the present disclosure may include a system for generating social media channel content based on content extracted from a container. The container may include various types of content (e.g., visual content, audio content, and/or text), which may be stored on a device and/or in a cloud environment. In some examples the container may store data for a social media application. In other examples, the container may store data for an additional application that the social media application has permission to access. In some examples, the system may suggest the creation of a new channel based on what is stored and/or recently captured in the container. In these examples, the system may also suggest a name, intended audience, and/or contributors for the new channel. Additionally or alternatively, the system may suggest content to be added to an existing channel based on what is stored and/or recently captured in the container.

As will be explained in greater detail below, embodiments of the instant disclosure may provide an easier means of creating channel content based on data previously generated in another context. This may improve the functioning of a computer itself by improving the computer's ability to meaningfully organize data and use the meaningfully organized data to generate new content. This may also improve the functioning of a computer itself by reducing the number of user inputs that must be received by the computer from a user attempting to access and/or create channel content.

The following will provide, with reference to FIG. 1, detailed descriptions of computer-implemented methods for predictively generating digital suggestions for channel content. Detailed descriptions of corresponding example systems will also be provided in connection with FIG. 2. In addition, detailed descriptions of corresponding user interfaces used within a channel suggestion and creation flow will be provided in connection with FIGS. 3-4.

FIG. 1 is a flow diagram of an exemplary computer-implemented method 100 for predictively generating digital suggestions for channel content. The steps shown in FIG. 1 may be performed by any suitable computer-executable code and/or computing system, such as the systems described herein. In one example, each of the steps shown in FIG. 1 may represent an algorithm whose structure includes and/or is represented by multiple sub-steps, examples of which will be provided in greater detail below.

Figure 2:
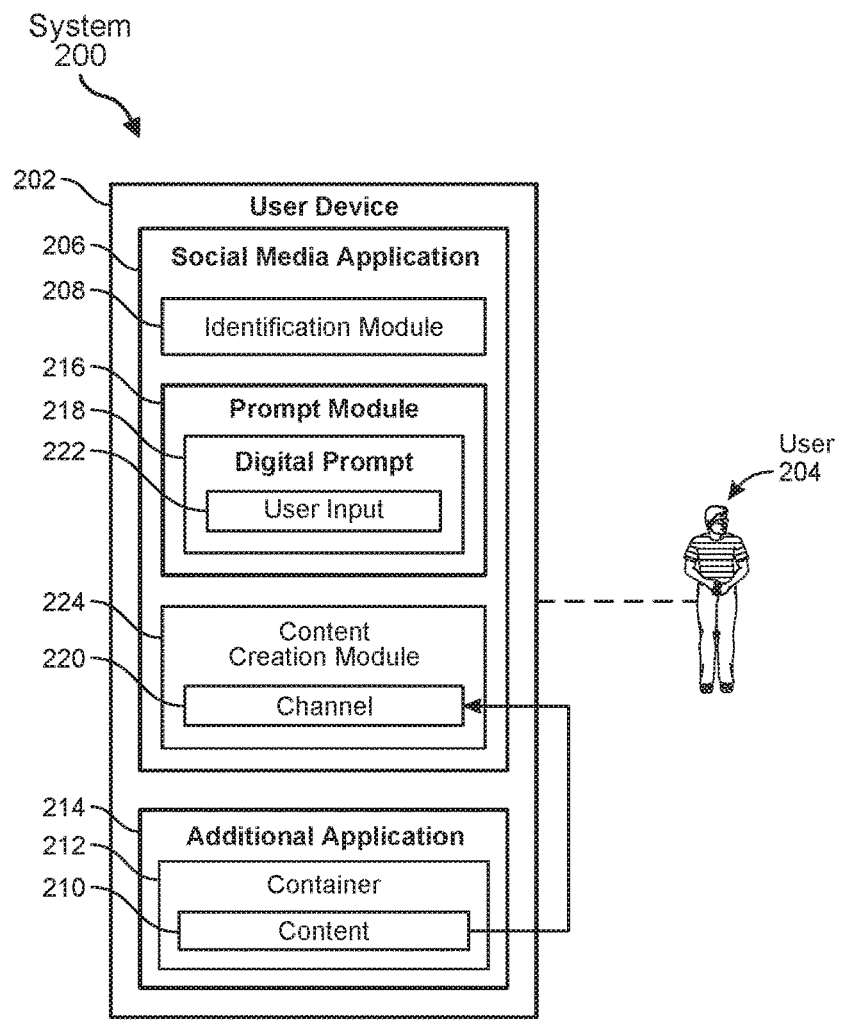
FIG. 2 is a block diagram of an exemplary system for generating digital channel content based on a predictive suggestion.

In one embodiment, the steps shown in FIG. 1 may be performed by modules operating within a user device 202, as shown in exemplary system 200 in FIG. 2. Additionally or alternatively, the steps shown in FIG. 1 may be performed by modules operating in a backend server (and/or a group of multiple servers that operate in conjunction with one another) maintained by and/or in behalf of a social networking platform.

User device 202 may represent any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 (e.g., user 204) may have a user account with a social-networking platform and may have an instance of a social networking application (i.e., social media application 206), which is managed by the social-networking platform and connected with the user's account, installed on user device 202. In these examples, the steps shown in FIG. 1 may be performed by modules operating in connection with the social media application 206.

Social media application 206 may represent any type or form of computer program managed by a social networking platform that is installed and executed on a user device to cause the user device to perform useful tasks related to social networking. In some examples, as will be discussed in greater detail below, social media application 206 may display various interfaces. These interfaces may include one or more composition interfaces and/or one or more consumption interfaces. The composition interfaces may allow users to create digital social media compositions. These compositions may be added to channels, which may be used to share the compositions with other users of the social networking platform. The consumption interfaces may allow users to view the compositions posted in the channels of other users.

The term "channel" may refer to any type or form of digital container, maintained by a social networking platform, that is dedicated to storing social media compositions from a designated source. A source of social media compositions may include, without limitation, a user account, a business account, and/or a predetermined set of user accounts and/or business accounts.

In some examples, the disclosed systems may automatically create a primary channel for each user account that is registered with the social networking platform, which may be dedicated to storing social media compositions created by its corresponding user account. In these examples, the disclosed systems may maintain each primary channel as long as its corresponding user account is active. The disclosed systems may also allow a user to create and add social media compositions to one or more additional channels. In some examples, an additional channel may be permanent (e.g., configured to be maintained as long as the user account that created the additional channel is active). In other examples, an additional channel may be ephemeral (e.g., set to expire after a certain amount of time).

Each channel may be designated by a name that distinguishes the channel from other channels. In some examples, the name may be assigned to the channel automatically. For example, a primary channel may be automatically assigned the name associated with its corresponding user account (e.g., the primary account created for the user account of an individual named "Mindy Harris" may be "Mindy Harris.") In other examples, the name may be configurable by a user. For example, an additional channel may be assigned with a name submitted via user input at the time the additional channel is created.

In some examples, a channel may be limited to only storing social media compositions from a single source (e.g., only a single user account may have permission to add social media compositions to the channel). In other examples, a channel may be limited to only storing posts from a predetermined set of sources (e.g., a limited set of user accounts may have permission to add content to the channel). In one such example, a user account creating an additional channel may be given the option to add additional user accounts as contributors to the additional channel. In this example, the sources of the additional channel may be limited to the user account and the additional user accounts added by the user account. In other examples, a channel may be designated as an open channel to which any user account may add social media compositions.

In certain embodiments, a channel may be dedicated to storing compositions relating to a particular topic and/or theme. As a specific example, a news organization may create an open channel related to a particular news event and/or movement to which any user account may add content. In this specific example, the open channel may be dedicated to social media compositions associated with the particular news event and/or movement. As another specific example, a group of friends may create a group channel related to a vacation taken by the group. In this specific example, the group channel may be dedicated to social media compositions associated with the vacation.

In addition to storing social media compositions, channels may be used as a vehicle for sharing social media compositions. In some examples, an audience for a channel may be configurable. For example, a user may select an audience for a channel via a setting in his or her user account. In examples in which a user account may add social media compositions to mutliple different channels, a user of the user account may select an audience (e.g., a different audience) for each of the channels. As a specific example, user 204's user account may have access to add content to its primary channel, a family channel, and a Hong Kong 2018 channel. In this example, user 204 may have designated all of his or her contacts as the audience for the primary channel, contacts who are family members as the audience for the family channel, and contacts with whom user 204 took a trip to Hong Kong as the audience for the Hong Kong 2018 channel.

Returning to FIG. 1, at step 110, one or more of the systems described herein may identify content stored in a digital container for a user of a social networking platform. For example, as illustrated in FIG. 2, an identification module 208 may identify content 210 being stored in a container 212 for user 204.

The term "digital container" as used herein may refer to any type or form of data structure that stores user-generated digital content. Container 212 may be configured to store any type or form of user-generated digital content (e.g., text-based content, visual content such as a digital image or a video, audio content such as an audio clip, etc.). In some examples, container 212 may store content 210 locally on user device 202. In additional or alternative examples, container 212 may store content 210 remotely using a cloud-based storage system.

In some examples, container 212 may operate as part of social media application 206 and may store data generated via social media application 206 or added to social media application 206. As a specific example, container 212 may represent a container corresponding to a particular channel and may store social media compositions added to the particular channel. In this specific example, content 210 may represent content within a social media composition added to the particular channel.

Figure 3:
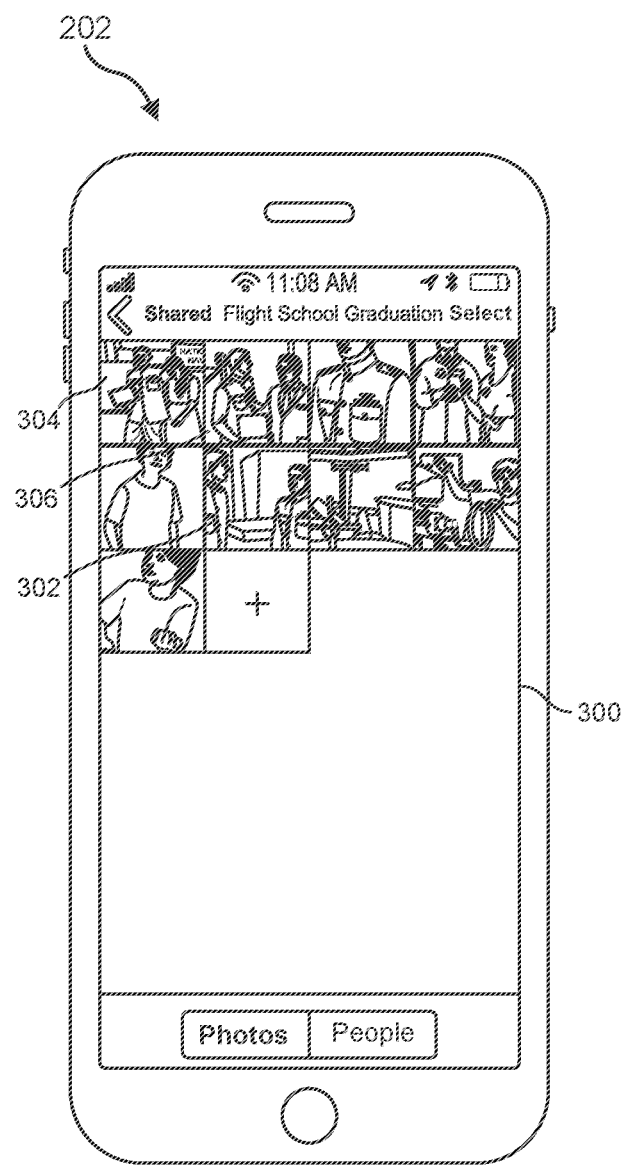
FIG. 3 is an illustration of an exemplary digital photo album that stores visual content.
Figure 4:
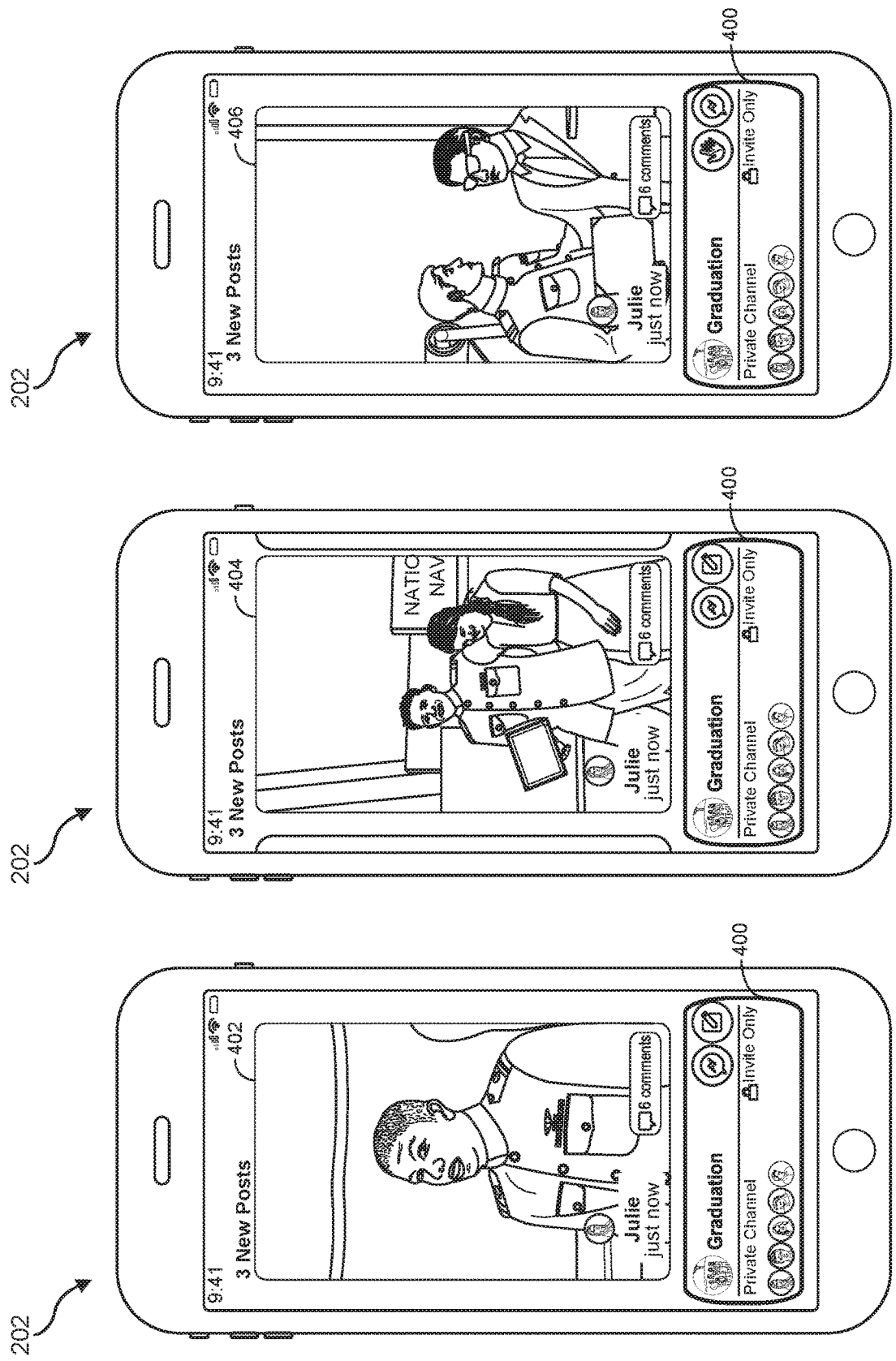
FIG. 4 is an illustration of an exemplary channel to which visual content form the digital photo album depicted in FIG. 3 has been added.

Additionally or alternatively, container 212 may operate as part of or in connection with an additional application 214 and may store user data generated via additional application 214 and/or added to additional application 214. For example, additional application 214 may represent a photo sharing application and container 212 may represent a digital photo album maintained by the photo sharing application. In this example, content 210 may represent one or more digital photos added to the digital photo album. FIG. 3 provides a specific example of a digital photo album 300, entitled "Flight School Graduation," that includes various digital photos of a graduation ceremony added by user 204.

In another example, additional application 214 may represent a messaging application (e.g., a text messaging application and/or an instant messaging application). In this example, container 212 may represent a container configured to store messages transmitted within a particular group chat of the messaging application and content 210 may represent content from one or more of the messages.

In another example, additional application 214 may represent a word processor application, container 212 may represent a folder configured to store documents generated using the word processor application, and content 210 may represent content within one or more of the documents. In another example, additional application 214 may represent an email application, container 212 may represent a folder for storing emails (e.g., an inbox folder and/or a sent folder) and content 210 may represent content within one or more of the emails.

Identification module 208 may identify content 210 in response to a variety of triggers. In some examples, identification module 208 may identify content 210 in response to content 210 being added to container 212. In one such example, a content-sharing module within social media application 206 and/or additional application 214 may be configured to automatically notify identification module 208 each time content (and/or each time a particular type of content) is added to container 212.

In other examples, identification module 208 may identify content 210 in response to sending a query for content 210 (e.g., to an Application Programming Interface (API) of a content-sharing module within social media application 206 and/or additional application 214). Identification module 208 may send any of a variety of different queries. For example, identification module 208 may send a query for new content that has been added to container 212 within a determined time period, a query for any content being stored by container 212, and/or a query for a particular type of content that is being stored in container 212 and/or that has been added to container 212 within a determined time period.

In some examples, identification module 208 may be configured to identify content that a user may be interested in (1) adding to a channel linked to the user and/or (2) using as a basis for a new channel. In these examples, identification module 208 may identify content 210 in response to a prediction that user 204 may be interested in adding content 210 to a channel and/or using content 210 as a basis for a new channel. This predictive selection of content may be based on a variety of factors. Such factors may include, without limitation, content that user 204 has added to a channel in the past, a browsing history of user 204, one or more preferences specified by user 204 via user input, a characteristic of content 210, content being added to channels by other users, etc.

Identification module 208 may access content 210 in a variety of ways. For example, in some examples, as discussed above, identification module 208 may operate as part of social media application 206 and container 212 may operate as part of additional application 214. In these examples, identification module 208 may access content 210 from a shared external file system (e.g., by accessing a public directory of additional application 214). In other examples, identification module 208 and container 212 may both operate as part of social media application 206. In these examples, identification module 208 may directly access content 210 from an internal file storage of social media application 206 (e.g., in response to querying a private directory of social media application 206) or by accessing a shared external file system.

In some embodiments, identification module 208 may, in addition to identifying content 210, identify supplemental information relating to content 210. For example, identification module 208 may identify one or more additional users with whom content 210 has been shared (i.e., additional users who have permission to access content 210).

As another example, identification module 208 may identify a name of content 210. For example, content 210 may represent a file and identification module 208 may identify a name of the file (e.g., a title assigned to the file by user 204). Additionally or alternatively, identification module 208 may identify a name of container 212. For example, container 212 may represent a shared photo album and identification module 208 may identify a name of the shared photo album (e.g., a title assigned to the shared photo album by the user who created the shared photo album). Returning to the specific example illustrated in FIG. 3, identification module 208 may identify that digital photo album 300 is named "Flight School Graduation."

In an additional or alternative example, identification module 208 may identify a theme based on content 210. For example, content 210 may include multiple related content items and identification module 208 may identify a common theme across the content items. As a specific example, identification module 208 may identify a series of messages within a group chat of a messaging application that includes photos of a newborn child and the text "Welcome to the world, Alice!" In this example, identification module 208 may identify the theme "New Baby" or "Alice" based on the content of the identified messages.

Returning to FIG. 1, at step 120, one or more of the systems described herein may provide the user with a digital prompt suggesting that the user add the content to a channel configured to share social media posts from the user to other users of the social networking platform. For example, a prompt module 216 may provide user 204 with a digital prompt 218 suggesting that user 204 add content 210 to a channel 220.

Digital prompt 218 may represent any type or form of digital interface configured to (1) display a suggestion to add content to a channel and (2) receive user input accepting and/or declining the suggestion. Digital prompt 218 may identify the content being suggested as content for channel 220 (i.e., content 210) in a variety of ways. For example, digital prompt 218 may include a visual depiction (e.g., a screenshot) of content 210. Additionally or alternatively, digital prompt 218 may include text (e.g., "Would you like to add these pictures from your photo album to your Friends Channel?," "Add this post from your Family Channel to your Study Group Channel?," etc.).

In some examples, digital prompt 218 may include a suggestion to create channel 220, in addition to the suggestion to add content 210 to channel 220. Using FIG. 3 as a specific example, identification module 208 may have detected that a number of digital photos were added to a shared digital photo album entitled "Flight School Graduation." In this example, digital prompt 218 may include a suggestion to create a new channel based on the digital photos added to the shared digital photo album.

In examples in which digital prompt 218 includes a suggestion to create channel 220, digital prompt 218 may also include one or more additional suggestions, beyond the suggestion to create channel 220. For example, digital prompt 218 may include a suggested name for channel 220. The suggested name may be based on information detected by identification module 208 (e.g., based on a name of container 212, a name of a file containing content 210, and/or a theme deduced based on the contents of content 210). Returning to FIG. 3 as a specific example, digital prompt 218 may include a suggestion to name channel 220 "Graduation," based on the name of digital photo album 300 and/or graduation-themed content identified in the images stored in digital photo album 300.

As another example, digital prompt 218 may include a suggested audience for channel 220 (that is, a group of one or more users with permission to view social media compositions posted to channel 220). Similarly, digital prompt 218 may include suggested contributors to be added to channel 220 (that is, a group of one or more users with permission to add social media compositions to channel 220). The suggested audience and/or contributors may also be based on information detected by identification module 208 (e.g., based on a list of users with permission to access container 212 and/or a list of users who are tagged in content 210). Returning to FIG. 3 as a specific example, digital prompt 218 may further include a suggestion to include users with whom the shared digital photo album was shared in an audience for channel 220 and/or as contributors to channel 220.

In one embodiment, prompt module 216 may suggest an audience and/or a list of contributors for channel 220 in line with a policy based on a type and/or characteristic of content 210. As a specific example, content 210 may include images of user 204's children and prompt module 216 may suggest an audience that is limited to family members based on a policy to automatically set family members as the audience for images that include user 204's children.

Prompt module 216 may provide digital prompt 218 in a variety of contexts. In some examples, prompt module 216 may provide digital prompt 218 via an interface of social media application 206. As a specific example, prompt module 216 may provide digital prompt 218 within a landing screen presented in response to user 204 opening social media application 206. As another specific example, prompt module 216 may provide digital prompt 218 in a composition-creation interface of social media application 206. In this example, user 204 may, upon initiating a process to create a composition, be presented with a suggestion for content to add to his or her composition (i.e., by being presented with digital prompt 218).

In other examples, prompt module 216 may provide digital prompt 218 via an interface of additional application 214. As a specific example, additional application 214 may represent a text messaging application and user 204 may have recently shared a link to a website in a text message to a friend. In this example, prompt module 216 may display, in a text messaging interface used to send the text message, a prompt (i.e., digital prompt 218) with a suggestion to add the link to user 204's primary channel.

Returning to FIG. 1, at step 130, one or more of the systems described herein may receive user input accepting the suggestion. For example, as illustrated in FIG. 2, prompt module 216 may receive user input 222, via user device 202, accepting the suggestion included within digital prompt 218. Additionally, in examples in which digital prompt 218 includes a suggestion to create channel 220, user input 222 may accept the suggestion to create channel 220, a suggestion relating to a name for channel 220, and/or a suggestion relating to an audience and/or contributors for channel 220.

Prompt module 216 may receive user input 222 in a variety of ways. For example, prompt module 216 may receive user input 222 via an auxiliary device, such as a keyboard and/or a digital mouse coupled to user device 202. As another example, prompt module 216 may receive user input 222 via a touchscreen of user device 202.

Finally, at step 140, one or more of the systems described herein may, in response to receiving the user input, add the content to the channel. For example, as illustrated in FIG. 2, a content creation module 224 may add content 210 to channel 220.

Content creation module 224 may add content 210 to channel 220 in a variety of ways. In some examples, content creation module 224 may create one or more social media compositions based on content 210. Then, content creation module 224 may post the social media compositions to channel 220. Using FIGS. 3-4 as a specific example, content creation module 224 may create (1) a social media composition 402 in FIG. 4 based on image 302 from digital photo album 300 in FIG. 3, (2) a social media composition 404 in FIG. 4 based on image 304 from digital photo album 300 in FIG. 3, and (3) a social media composition 406 in FIG. 4 based on image 306 from digital photo album 300 in FIG. 3. Then, content creation module 224 may post social media compositions 402-406 to channel 400 in FIG. 4 such that social media compositions 402-406 may be viewed by users within an audience of channel 400.

Additionally, in examples in which digital prompt 218 includes a suggestion to create channel 220, content creation module 224 may create channel 220. In these examples, content creation module 224 may also provide a name for channel 220, designate an audience for channel 220, and/or add one or more contributors to channel 220 (e.g., based on user input 222 received at step 130 that accepts a suggested name, audience, and/or list of contributors for channel 220). Returning to FIGS. 3-4 as a specific example, content creation module 224 may create channel 400 and give channel 400 the title "Graduation" and may add, to an audience for channel 400, users with access to digital photo album 300 in FIG. 3.

In examples in which container 212 represents a shared container, content creation module 224 may be limited to adding content to channel 220 that was added to container 212 by user 204. In other words, user 204 may not be asked and/or may not be permitted to add content created by another user to channel 220.

As described throughout the instant disclosure, the disclosed systems and methods may provide a system for generating a new social media channel and/or adding content to an existing social media channel based on content extracted from a content sandbox (e.g., a container). In one example, a computer-implemented method may include (1) identifying content stored in a digital container for a user of a social networking platform, (2) providing the user with a digital prompt suggesting that the user add the content to a channel configured to share social media posts from the user to other users of the social networking platform, (3) receiving user input accepting the suggestion, and (4) in response to receiving the user input, adding the content to the channel.

In one embodiment, the method may further include (1) suggesting, via the digital prompt, that the user create the channel and, in response to receiving user input accepting the suggestion to create the channel, (2) creating the channel. As part of suggesting that the user create the channel, the method may, in some embodiments, include suggesting a name for the channel and/or an audience for the channel. The content may include a variety of different types of content (e.g., visual content, audio content, and/or text) and/or may be identified in a variety of contexts (e.g., from one or more digital text messages, one or more digital photo albums, and/or one or more posts to an additional channel). The digital prompt may be provided via a variety of different interfaces (e.g., via an interface of a social networking application, running on a device of the user and managed by the social networking platform, and/or via an interface of an application that was used to generate the content).

In one embodiment, a system for implementing the above-described method may include an identification module, stored in memory, that identifies content stored in a digital container for a user of a social networking platform. The system may also include a prompt module, stored in memory, that (1) provides the user with a digital prompt suggesting that the user add the content to a channel configured to share social media posts from the user to other users of the social networking platform and (2) receives user input accepting the suggestion. The system may also include a content creation module, stored in memory, that, in response to the prompt module receiving the user input, adds the content to the channel and a physical processor configured to execute the identification module, the prompt module, and the content creation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify content stored in a digital container for a user of a social networking platform, (2) provide the user with a digital prompt suggesting that the user add the content to a channel configured to share social media posts from the user to other users of the social networking platform, (3) receive user input accepting the suggestion, and (4) in response to receiving the user input, add the content to the channel.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying content from one or more messages of a group chat stored in a digital container, wherein:
      the digital container is configured to store the messages for a user, participating in the group chat, who has a user account registered with a social networking platform; and
      the social networking platform (1) automatically creates a primary channel for each user account that is registered with the social networking platform and (2) allows user accounts to create additional channels dedicated to social media posts relating to a particular theme;
   providing the user with a digital prompt suggesting that the user create an additional channel dedicated to a theme deduced based on the identified content and add the content to the additional channel;
   receiving user input accepting the suggestion; and in response to receiving the user input, creating the additional channel and adding the content to the additional channel.

2. The computer-implemented method of claim 1, wherein:
   each primary channel maintained by the social networking platform is automatically assigned the name associated with its corresponding user account; and
   additional channels are configured to have a user-assigned names.

3. The computer-implemented method of claim 2, further comprising suggesting, via the digital prompt, a name for the channel.

4. The computer-implemented method of claim 2, further comprising suggesting, via the digital prompt, an audience for the channel.

5. The computer-implemented method of claim 1, wherein the content comprises at least one of:
   visual content;
   audio content; or
   text.

6. The computer-implemented method of claim 1, further comprising, in response to receiving the user input, adding the participants of the group chat as contributors to the additional channel.

7. The computer-implemented method of claim 1, wherein:
   identifying the content comprises identifying a plurality of related content items; and
   the method further comprises determining the theme based on the related content items.

8. The computer-implemented method of claim 1, wherein providing the user with the digital prompt comprises providing the digital prompt via an interface of a social networking application, running on a device of the user and managed by the social networking platform.

9. The computer-implemented method of claim 1, wherein providing the user with the digital prompt comprises providing the digital prompt via an interface of an application that was used to generate the content.

10. A system comprising:
   an identification module, stored in memory, that identifies content from one or more messages of a group chat stored in a digital container, wherein:
      the digital container is configured to store the messages for a user, participating in the group chat, who has a user account registered with a social networking platform; and
      the social networking platform (1) automatically creates a primary channel for each user account that is registered with the social networking platform and (2) allows user accounts to create additional channels dedicated to social media posts relating to a particular theme;
   a prompt module, stored in memory, that:
      provides the user with a digital prompt suggesting that the user create an additional channel dedicated to a theme deduced based on the identified content and add the content to the additional channel; and
      receives user input accepting the suggestion;
   a content creation module, stored in memory, that, in response to the prompt module receiving the user input, creates the additional channel and adds the content to the additional channel; and
   at least one physical processor configured to execute the identification module, the prompt module, and the content creation module.

11. The system of claim 10, wherein:
   each primary channel maintained by the social networking platform is automatically assigned the name associated with its corresponding user account; and
   additional channels are configured to have a user-assigned name.

12. The system of claim 11, wherein the digital prompt further suggests a name for the channel.

13. The system of claim 11, wherein the digital prompt further suggests an audience for the channel.

14. The system of claim 10, wherein the content comprises at least one of:
   visual content;
   audio content; or
   text.

15. The system of claim 10, wherein the content creation module further adds the participants of the group chat as contributors to the additional channel.

16. The system of claim 10, wherein:
   the identification module identifies the content by identifying a plurality of related content items and determines the theme based on the related content items.

17. The system of claim 10, wherein the prompt module provides the user with the digital prompt via an interface of a social networking application, running on a device of the user and managed by the social networking platform.

18. The system of claim 10, wherein the prompt module provides the user with the digital prompt via an interface of an application that was used to generate the content.

19. A non-transitory computer-readable medium comprising one or more computer-readable instructions that, when executed by at least one processor of a computing device, cause the computing device to:
   identify content from one or more messages of a group chat stored in a digital container, wherein:
      the digital container is configured to store the messages for a user, participating in the group chat, who has a user account registered with a social networking platform; and
      the social networking platform (1) automatically creates a primary channel for each user account that is registered with the social networking platform and (2) allows user accounts to create additional channels dedicated to social media posts relating to a particular theme;
   provide the user with a digital prompt suggesting that the user create an additional channel dedicated to a theme deduced based on the identified content and add the content to the additional channel;
   receive user input accepting the suggestion; and
   in response to receiving the user input, create the additional channel and add the content to the additional channel.

20. The non-transitory computer-readable medium of claim 19, wherein the computer-readable instructions further suggest, via the digital prompt, a name for the channel.

* * * * *